(12) United States Patent
Cottard et al.

(10) Patent No.: US 7,414,737 B2
(45) Date of Patent: Aug. 19, 2008

(54) POSITIONING DEVICE FOR POSITIONING A USER BY USING BOTH EYES AS POSITION MARKERS

(75) Inventors: Martin Cottard, Vaucresson (FR); Joël-Yann Fourre, Montreuil (FR); Aurélie Morin, Eragny sur Oise (FR); Gilles Monteilliet, Closeaux (FR)

(73) Assignee: Sagem Defense Securite, Paris (FR)

(*) Notice: Subject to any disclaimer, the term of this patent is extended or adjusted under 35 U.S.C. 154(b) by 148 days.

(21) Appl. No.: 10/573,259

(22) PCT Filed: Sep. 24, 2004

(86) PCT No.: PCT/FR2004/002421

§ 371 (c)(1),
(2), (4) Date: Mar. 23, 2006

(87) PCT Pub. No.: WO2005/034018

PCT Pub. Date: Apr. 14, 2005

(65) Prior Publication Data

US 2007/0052959 A1 Mar. 8, 2007

(30) Foreign Application Priority Data

Oct. 1, 2003 (FR) .................................. 03 11485

(51) Int. Cl.
*G01B 11/14* (2006.01)
(52) U.S. Cl. ............................................. 356/620
(58) Field of Classification Search ......... 356/247–255; 359/368, 372–375, 480–482; 351/243, 204, 351/211
See application file for complete search history.

(56) References Cited

U.S. PATENT DOCUMENTS

| 3,475,082 | A | * | 10/1969 | Strietzel ..................... 351/205 |
| 4,712,895 | A | * | 12/1987 | Kamiyama et al. .......... 351/243 |
| 5,042,937 | A | * | 8/1991 | Cornsweet ................... 351/204 |
| 5,579,158 | A | * | 11/1996 | Padula ......................... 359/482 |
| 6,445,497 | B1 | * | 9/2002 | Adda ........................... 359/428 |

FOREIGN PATENT DOCUMENTS

EP 1 041 522 A2 10/2000
WO WO-00/39760 A1 7/2000

OTHER PUBLICATIONS

Wildes, R.P., Proceedings of the IEEE, IEEE. New York, US, vol. 85, No. 9, Sep. 1, 1997, pp. 1348-1363.

* cited by examiner

*Primary Examiner*—Tarifur R. Chowdhury
*Assistant Examiner*—Isiaka O Akanbi
(74) *Attorney, Agent, or Firm*—Muncy, Geissler, Olds & Lowe, PLLC

(57) ABSTRACT

A user positioning device comprising a stand (1) carrying two positioning markers (5) that are disposed so that each can be seen by a respective one of the eyes of a user, when the user is positioned correctly, and means (7) for forming a light path between each of the eyes of the user and the corresponding positioning marker, the light paths being optically separate from each other relative to the eyes of the user.

4 Claims, 4 Drawing Sheets

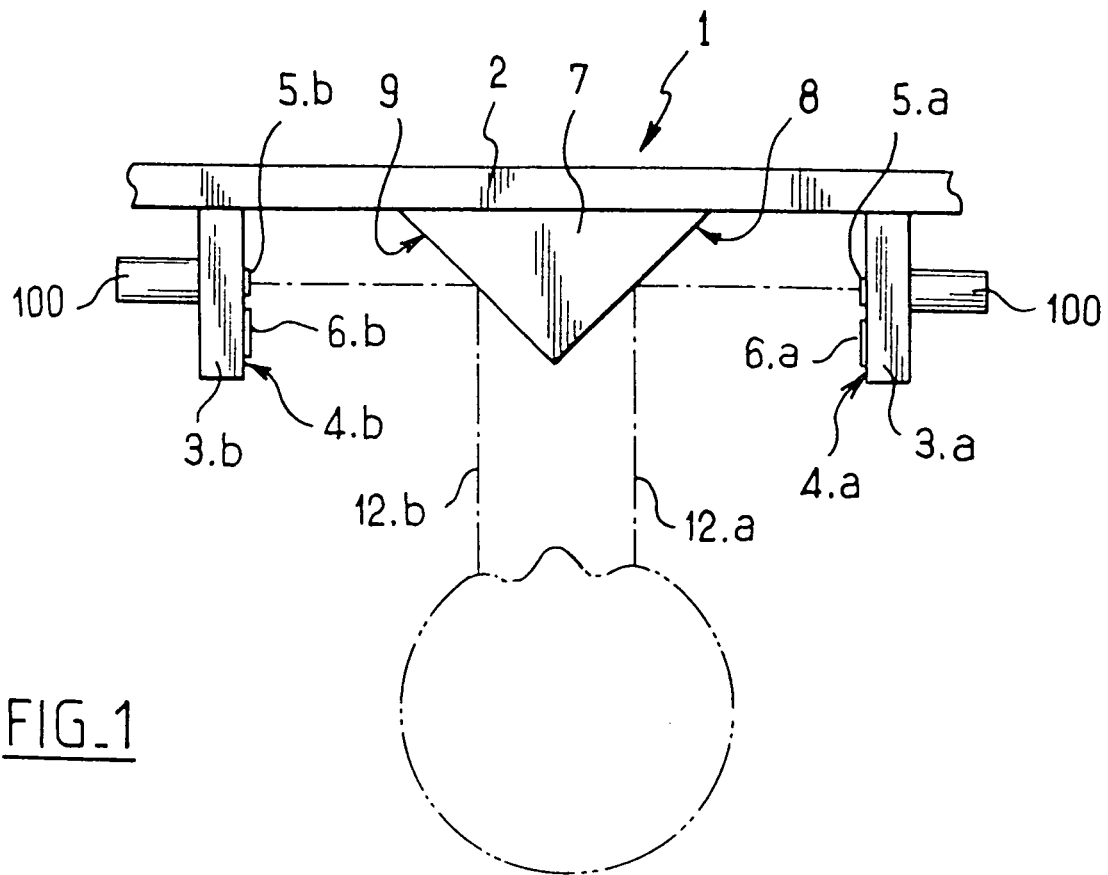
FIG_1
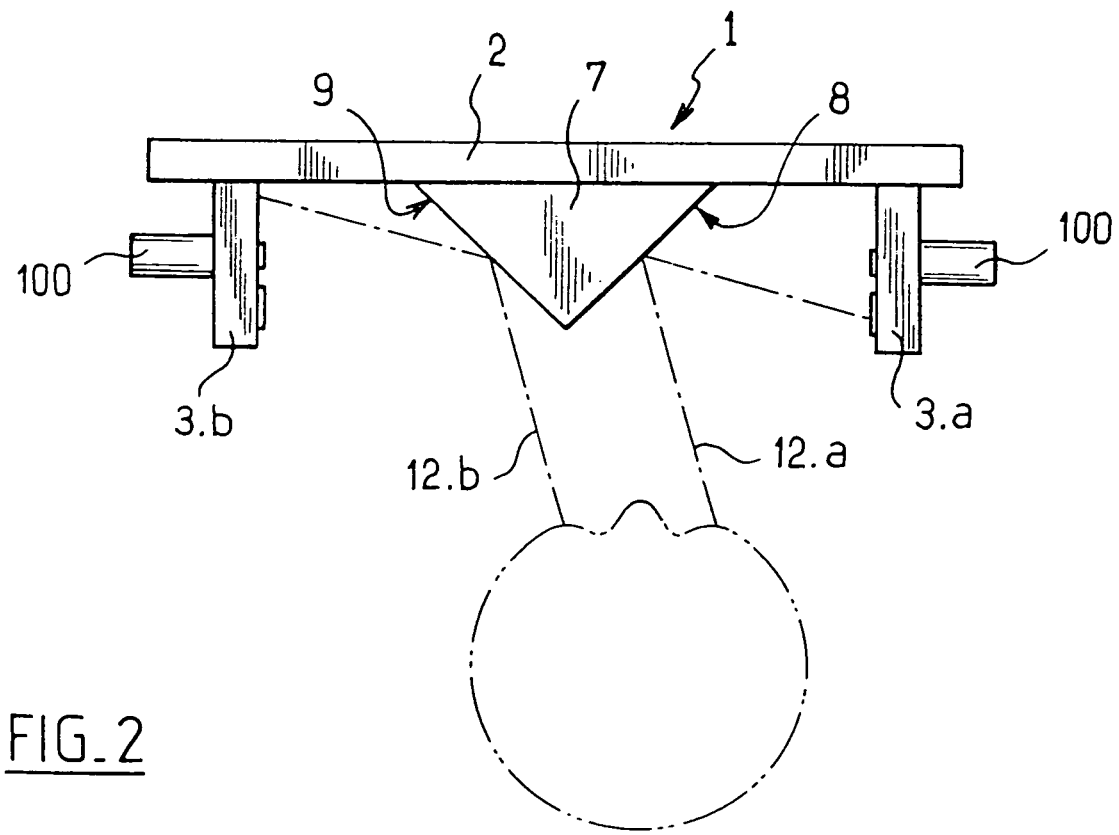
FIG_2

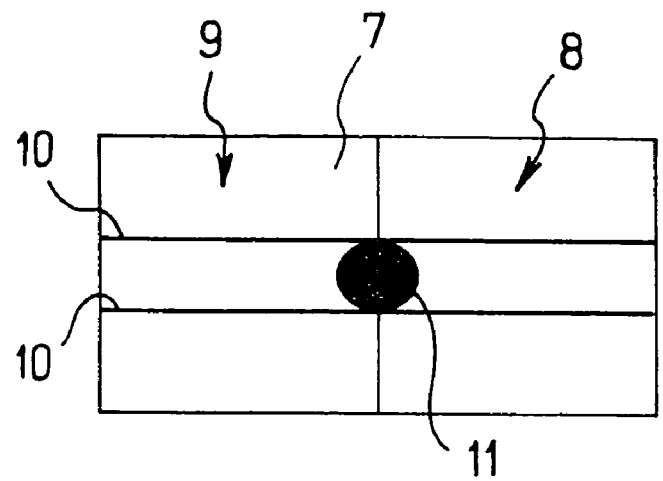
FIG_3
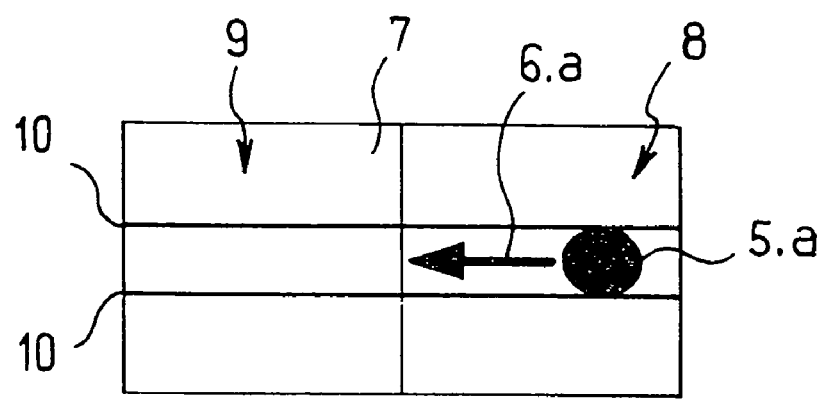
FIG_4
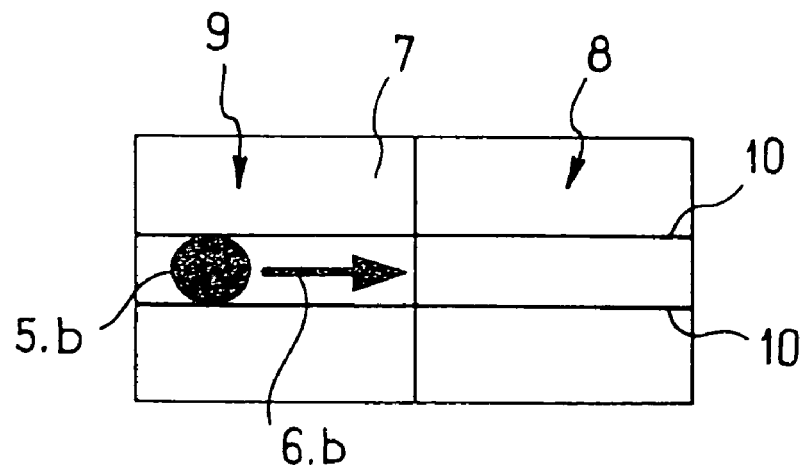
FIG_5

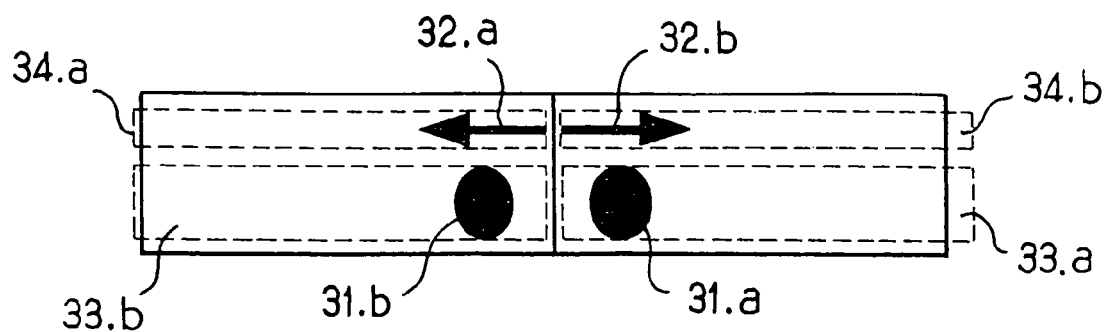
FIG_8
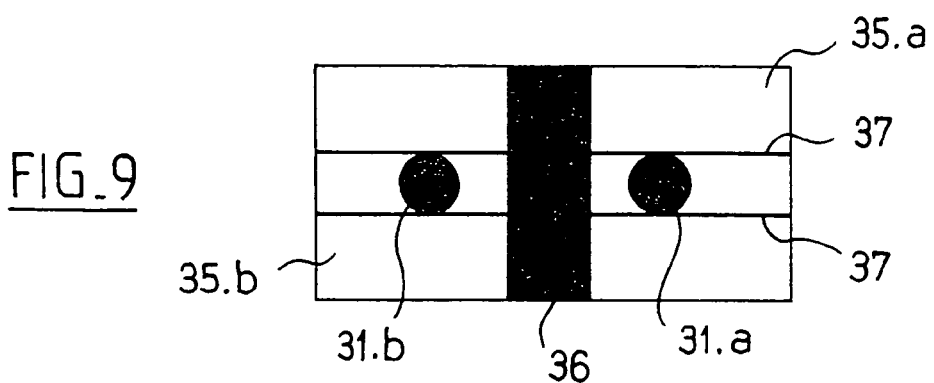
FIG_9
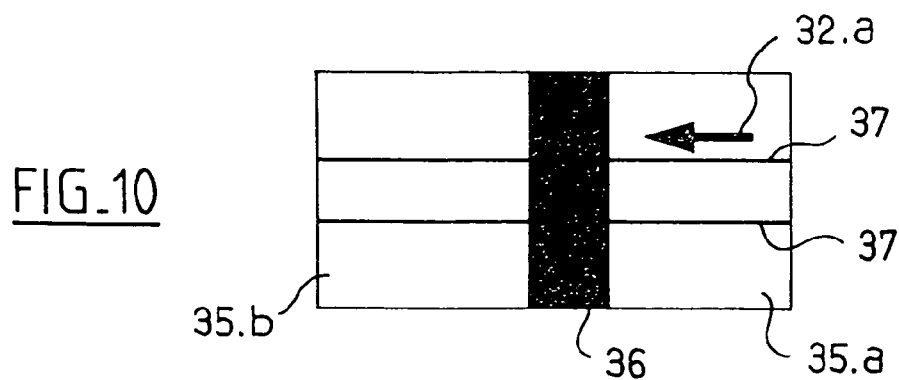
FIG_10
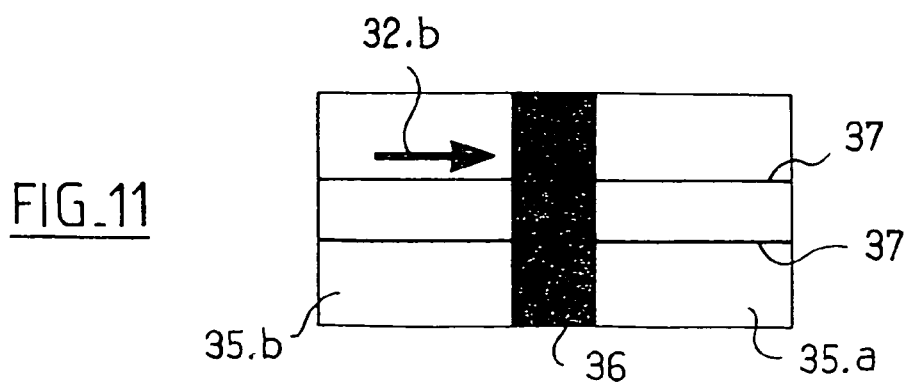
FIG_11

POSITIONING DEVICE FOR POSITIONING A USER BY USING BOTH EYES AS POSITION MARKERS

The present invention relates to a positioning device for positioning a user by using both eyes as position markers.

By way of example, such a positioning device is used to position the face of a user in front of an identification device that is used to recognize the face or the eyes of the user.

BACKGROUND OF THE INVENTION

Identification devices for identifying an individual by the iris of the eye include cameras for taking images of the irises of the user. It is necessary for the eyes of the user to be positioned correctly relative to the cameras, in order to acquire images that offer a quality that is sufficient to enable the irises to be recognized, and the user to be identified.

It has thus been envisaged to associate a user positioning device with the identification device. The positioning device detects the position of the user, and sends visual or sound indications to the user, thereby enabling the user to change position if the position is not correct.

In order to simplify positioning the user, the positioning devices generally present, to the user, visual markers with which the user should align each eye. Unfortunately, some people possess a preferred eye for aiming into 3D space. These people subconsciously tend to use only the "leading" eye to align themselves with the markers. This results in bad positioning, thereby making it impossible to acquire correct images of the irises of the user. Such positioning devices thus cannot be used with such people.

The only currently-known solution for solving this problem consists in educating the users, so as to teach them to position themselves correctly. However, such education is relatively time-consuming, and is quickly forgotten if the positioning device is not used over a period of time.

There also exist identification devices in which the cameras are motor-driven so that they can be positioned relative to the eyes of the user, who remains stationary. However, such devices are relatively complex and costly. Furthermore, there exists a risk of the camera targeting the wrong eye.

OBJECT OF THE INVENTION

An object of the invention is to provide a means that makes it possible to position a user accurately.

BRIEF DESCRIPTION OF THE INVENTION

To this end, the invention provides a user positioning device comprising a stand carrying two positioning markers that are disposed so that each can be seen by a respective one of the eyes of a user, when the user is positioned correctly, and means for forming a light path between each of the eyes of the user and the corresponding positioning marker, the light paths being optically separate from each other relative to the eyes of the user.

Thus, the right eye cannot see the positioning marker corresponding to the left eye, and vice versa. The problem of the leading eye is therefore overcome.

In a first embodiment, the means for forming the light paths comprise a prism that is reflective, at least in part, the positioning markers and the prism being mounted on the stand in such a manner that the prism has surfaces that substantially face respective positioning markers in order to reflect each positioning marker towards the corresponding eye of the user.

The device is thus particularly simple in structure.

In a second embodiment, the means for defining the light paths comprise filter means that preferably comprise two polarizers of a first type that are disposed one in front of the other in register with one of the positioning markers, and two polarizers of a second type that are disposed one in front of the other and in register with the other one of the positioning markers.

When the eyes of the user are in alignment with their corresponding polarizers, the user sees both positioning markers. Otherwise, one of the eyes of the user is in alignment with the two different types of polarizer, such that the user cannot see the marker.

Other characteristics and advantages of the invention appear on reading the following description of particular non-limiting embodiments of the invention.

BRIEF DESCRIPTION OF THE DRAWINGS

Reference is made to the accompanying drawings, in which:

FIG. 1 is a diagrammatic plan view of a positioning device constituting a first embodiment of the invention, with a user being positioned correctly relative to said device;

FIG. 2 is a view similar to the FIG. 1 view, with the user being positioned incorrectly;

FIG. 3 shows the image seen by the user when the user is properly positioned;

FIGS. 4 and 5 show the images seen by the user when the user is wrongly positioned;

FIG. 8 is a diagrammatic and fragmentary elevation view of the device;

FIG. 9 shows the image seen by the user when the user is properly positioned; and FIGS. 10 and 11 show the images seen by the user when the user is wrongly positioned.

DETAILED DESCRIPTION OF THE INVENTION

Figure 6:
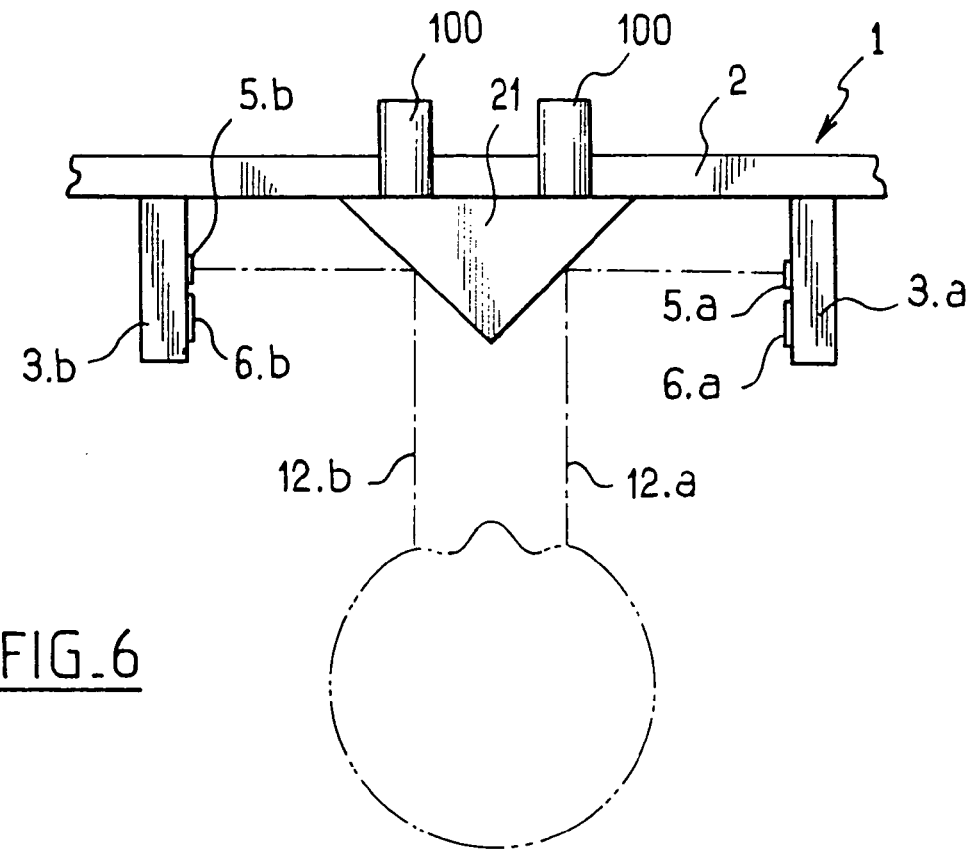
FIG. 6 is a view similar to FIG. 1 showing a positioning device constituting a variant of the first embodiment.

The positioning device of the invention is for equipping a user identification device that functions by recognizing the irises of users. In manner known per se, the identification device includes cameras 100 for acquiring images of the irises of the user, and an image processing module including, in particular, a database associating the identities of users with characteristics that are representative of their irises. Each camera 100 supplies at least one image of one of the irises of the user to the processing module, in which the images are processed in such a manner as to extract representative characteristics therefrom that are compared with representative characteristics contained in the database.

With reference to FIGS. 1 and 2, the positioning device constituting a first embodiment of the invention includes a stand given overall reference 1, and that is generally U-shaped.

The stand comprises a front portion 2 from which there extend a right wing and a left wing 3.*a*, 3.*b*, that have respective facing surfaces 4.*a*, 4.*b*.

The surface 4.*a* of the right wing 3.*a* carries a positioning marker 5.*a* that is formed by a spot, and a horizontally-directed repositioning arrow 6.*a* that points away from the front portion 2. The surface 4.*b* of the left wing 3.*b* also carries a positioning marker 5.b that is formed by a spot, and a horizontally-directed repositioning arrow 6.b that points away from the front portion 2.

A reflective prism 7, that presents a triangular section in plan view, is mounted on the front portion 2 of the stand 1 between the wings 3.a, 3.b. The reflective prism 7 has surfaces 8, 9 that are at an angle relative to the wings 3.a, 3.b. Two positioning lines 10 extend horizontally over the surfaces 8, 9 of the reflective prism 7.

The cameras 100 of the identification device are mounted on the wings 3.a, 3.b, in order to take the images of the irises as reflected by the corresponding surfaces 8, 9 of the reflective prism 7.

When in front of the positioning device, the user should take up a position so as to see a spot 11 that is located on the edge of the reflective prism 7 between the two positioning lines 10 that are marked thereon (see FIGS. 1 and 3). The spot is in fact constituted by superposing the images of the positioning markers 5.a, 5.b as seen by the eyes of the user.

The two positioning lines 10 make it possible to position the head of the user at the correct height. If, the spot is situated above the top positioning line 10, the head of the user should be positioned lower, and vice versa.

If the user is too far to the right, the user sees the image of the repositioning arrow 6.a reflected on the surface 8 of the reflective prism 7, with said arrow indicating the direction in which the user should move in order to be positioned correctly, i.e. in this event, the user should move to the left (see FIGS. 2 and 4).

Conversely, if the head of the user is too far to the left, the user sees the reflection of the repositioning arrow 6.b on the surface 9 of the reflective prism 7, with said arrow indicating that the user should move to the right in order to be positioned correctly (see FIG. 5).

The reflective prism 7 serves to form a light path 12.a (shown by dot-and-dash lines) between the right eye of the user and the corresponding positioning marker 6.a, and a light path 12.b (shown by dot-and-dash lines) between the left eye of the user and the corresponding positioning marker 6.b. The light paths 12.a and 12.b are optically separate from each other relative to the eyes of the user. Thus, the positioning marker 5.b that is intended to be seen by the left eye of the user cannot be seen by the right eye of said user, and vice versa.

In a variant, the cameras 100 can be mounted on the front portion 2 of the stand 1 on either side of the reflective prism 7.

In another variant shown in FIG. 6, the device can include a semi-reflective prism 21 instead of the reflective prism 7. The cameras 100 are thus disposed behind the semi-reflective prism 21.

Figure 7:
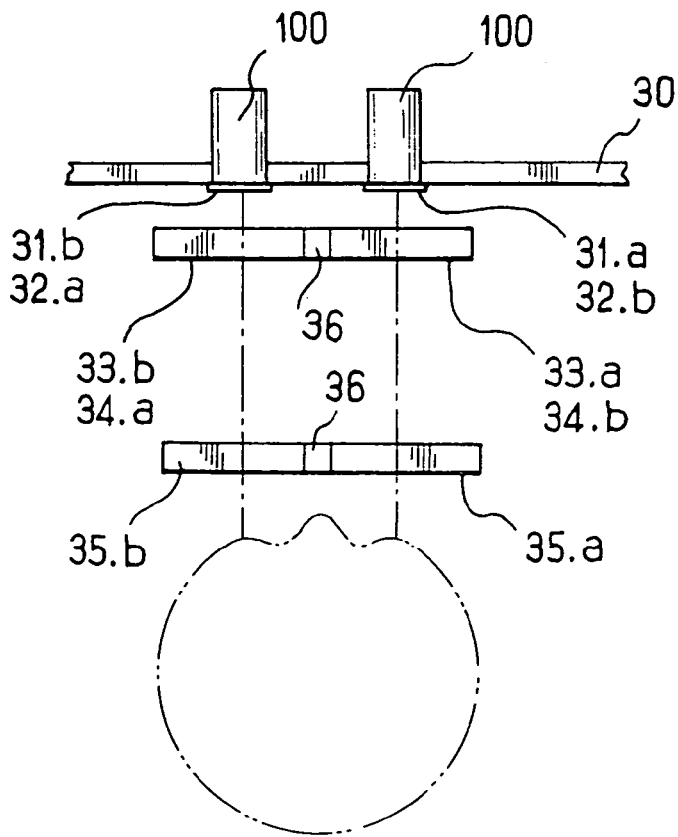
FIG. 7 is a view similar to FIG. 1 showing a positioning device constituting a second embodiment of the invention, with a user being positioned correctly relative to said device.

With reference to FIGS. 7 and 8, and in a second embodiment, the device of the invention includes a stand 30, on a surface of which there are shown positioning markers 31.a, 31.b, each formed by a spot in this example. A repositioning arrow 32.b, 32.a is shown above each positioning marker 31.a, 31.b respectively. The repositioning arrows 32.a, 32.b are horizontal, and they point away from each other.

Filter means are mounted on the stand 30 to extend in register with the positioning markers 31.a, 31.b, and with the repositioning arrows 32.a, 32.b.

The filter means comprise a vertical polarizer 33.a disposed in front of the positioning marker 31.a, and a horizontal polarizer 33.b disposed in front of the positioning marker 31.b (the polarizers are shown by dashed lines in FIG. 8).

The filter means also comprise a vertical polarizer 34.a disposed in front of the repositioning arrow 32.a, and a horizontal polarizer 34.b disposed in front of the repositioning arrow 32.b.

The filter means further comprise a vertical polarizer 35.a disposed in front of the vertical polarizer 33.a and the horizontal polarizer 34.b, and a horizontal polarizer 35.b disposed in front of the horizontal polarizer 33.b and the vertical polarizer 34.a. Two positioning lines 37 are shown horizontally on the polarizers 35.a and 35.b for positioning the user in terms of height (the principle is the same as that for the first embodiment).

The pairs of adjacent polarizers a and b are separated by an opaque strip 36.

The polarizers 35.a and 35.b are spaced apart from the polarizers in front of which they are placed so that:

when the user is properly placed (FIG. 9), the right eye sees the positioning marker 31.a through the vertical polarizers 35.a and 33.a (the repositioning arrow 32.a cannot be seen since it is not in the axis of the eye, and since it is masked by at least one of the opaque strips 36; the repositioning arrow 32.b cannot be seen since it is behind the horizontal polarizer 34.b), and the left eye sees the positioning marker 31.b through the horizontal polarizers 35.b and 33.b (the repositioning arrow 32.b cannot be seen since it is not in the axis of the eye, and since it is masked by at least one of the opaque strips 36; the repositioning arrow 32.a cannot be seen since it is behind the vertical polarizer 34.a)

when the user is offset to the right (FIG. 10), the right eye sees, through the vertical polarizers 35.a and 34.a, the repositioning arrow 32.a, that indicates that the user should move to the left; and when the user is offset to the left (FIG. 11), the left eye sees, through the vertical polarizers 35.b and 34.b, the repositioning arrow 32.b, that indicates that the user should move to the right.

The polarizers 34, 35 thus make it possible to define two light paths 37.a and 37.b between each of the eyes of the user, and the corresponding positioning marker. The light paths are optically separate from each other relative to the eyes of the user.

Naturally, the invention is not limited to the embodiments described, and variant embodiments could be applied thereto without going beyond the ambit of the invention as defined by the claims.

In particular, although the light paths are optically separated from each other by optical means, in the embodiments described, it is possible to separate the light paths optically by physical means, such as a partition forming a visual obstacle that prevents the positioning marker for the right eye from being seen by the left eye, and vice versa.

The positioning or repositioning markers can have shapes other than the shapes described.

Polarizers of types other than the types described can be used. The filter means can also comprise a filter that allows red light to pass, disposed in register with the left eye, and a filter that allows blue light to pass, disposed in register with the right eye, the positioning marker that is intended to be seen by the left eye thus being red, and the positioning marker that is intended to be seen by the right eye thus being blue. Thus, the red positioning marker cannot be seen by the right eye through the filter that allows blue light to pass, but can be seen by the left eye through the filter that allows red light to pass, and vice versa. Naturally, other colors could be used.

What is claimed is:

1. A user positioning device comprising a stand carrying two positioning markers that are disposed so that each can be seen by a respective one of the eyes of a user, when the user is positioned correctly and two repositioning markers that are disposed so that one of each can be seen by a respective one of the eyes of the user when the user is not positioned correctly, and means for forming a light path between each of the eyes of the user and the corresponding positioning marker, the light paths being optically separate from each other relative to the eyes of the user.

2. A device according to claim 1, wherein the means for forming the light paths comprise a prism that is reflective, at least in part, the positioning markers and the prism being mounted on the stand in such a manner that the prism has surfaces that substantially face respective positioning markers in order to reflect each positioning marker towards the corresponding eye of the user.

3. A device according to claim 1, wherein the means for defining the light paths comprise filter means.

4. A device according to claim 3, wherein the filter means comprise two polarizers of a first type that are disposed one in front of the other in register with one of the positioning markers, and two polarizers of a second type that are disposed one in front of the other in register with the other one of the positioning markers.

* * * * *